(12) United States Patent
Kusunoki et al.

(10) Patent No.: US 6,614,169 B2
(45) Date of Patent: Sep. 2, 2003

(54) DISPLAY DEVICE USING THIN FILM CATHODE AND ITS PROCESS

(75) Inventors: Toshiaki Kusunoki, Tokorozawa (JP);
Mutsumi Suzuki, Kodaira (JP);
Masakazu Sagawa, Inagi (JP)

(73) Assignee: Hitachi, Ltd., Tokyo (JP)

( * ) Notice: Subject to any disclaimer, the term of this patent is extended or adjusted under 35 U.S.C. 154(b) by 57 days.

(21) Appl. No.: 09/791,699

(22) Filed: Feb. 26, 2001

(65) Prior Publication Data

US 2001/0017515 A1 Aug. 30, 2001

(30) Foreign Application Priority Data

Feb. 29, 2000 (JP) ........................................ 2000-102860

(51) Int. Cl.[7] .................................................. H01J 1/62
(52) U.S. Cl. ........................... 313/496; 445/50; 445/46; 445/24; 445/49; 445/51; 445/25
(58) Field of Search ................................ 313/495, 496, 313/311, 346 R, 498, 499, 582, 584, 585, 587; 445/46, 49, 50, 51, 24, 25

(56) References Cited

U.S. PATENT DOCUMENTS 5,853,310 A * 12/1998 Nishimura et al. ......... 313/495
5,894,189 A * 4/1999 Ogasawara et al. ......... 313/310
6,130,503 A * 10/2000 Negishi et al. ............. 313/495
6,259,198 B1 * 7/2001 Yanagisawa et al. ........ 313/495
6,447,355 B1 * 9/2002 Uda et al. ..................... 445/51

FOREIGN PATENT DOCUMENTS

| JP | 2-121227 | 5/1990 |
|---|---|---|
| JP | 2-172127 | 7/1990 |
| JP | 3-55738 | 3/1991 |
| JP | 8-180794 | 7/1996 |
| JP | 2001-23551 | 1/2001 |

* cited by examiner

Primary Examiner—Sandra O'Shea
Assistant Examiner—Sumati Krishnan
(74) Attorney, Agent, or Firm—Mattingly, Stanger & Malur, P.C.

(57) ABSTRACT

Disclosed is a display device with improved brightness achieved by increasing electron emission efficiency of a thin film cathode. Phosphors are irradiated with electrons emitted to a vacuum through a flat thin film which is thinner than 5 nm and is disposed so as to face the phosphors. A top electrode for emitting the electrons is formed by stacking thin films of Ir, Pt, and Au, and performing a heat treatment so as to reconstruct the top electrode to have a structure in which thick island parts and a flat thin film part mixedly exist.

18 Claims, 12 Drawing Sheets

×3,500

×50,000

DISPLAY DEVICE USING THIN FILM CATHODE AND ITS PROCESS

FIELD OF THE INVENTION

The present invention relates to a display device using a thin film cathode for emitting electrons into a vacuum from an electron emitting portion and a process for fabricating the display device.

BACKGROUND OF THE INVENTION

A thin film cathode has, basically, a three-thin-film structure of a top electrode, an insulator (or semiconductor layer or the like), and a base electrode. By applying a voltage between the top and base electrodes, electrons are emitted from the surface of the top electrode into a vacuum. For example, there are an MIM (Metal-Insulator-Metal) type, an MIS (Metal-Insulator-Semiconductor) type, and the like.

The MIM type thin film cathode is described in, for example, Japanese Unexamined Patent Publication No. 7-65710 by the inventors of the present invention. FIG. 2 shows the operating principles of the disclosed technique. When a driving voltage Vd is applied between a top electrode 13 and a base electrode 11 to set the electric field in an insulator 12 to about 1 to 10 MV/cm, electrons around the Fermi level in the base electrode 11 pass through a barrier by the tunnel effect, are injected to a conduction band of the insulator 12 and the top electrode 13, and become hot electrons. The hot electrons are scattered in the insulator 12 and the top electrode 13, thereby losing their energy. A part of the hot electrons having energy of a work function $\phi$ of the top electrode 13 or more is emitted to a vacuum 20.

When a plurality of top electrodes 13 and a plurality of base electrodes 11 are arranged orthogonal to each other in a matrix, a thin film cathode can generate an electron beam from an arbitrary position. Consequently, the thin film cathode can be used as a cathode of a display device or the like. Electron emission has been observed from an MIM (Metal-Insulator-Metal) structure made of Au—$Al_2O_3$—Al and the like.

In the case of applying the thin film cathode to a display device or the like, it is desirable to use a thin film cathode having a high electron emission efficiency, that is, a high ratio of emission current to an injection current (diode current). The higher the electron emission efficiency becomes, the more the brightness of the display device improves and, at the same brightness, the power consumption of the display device decreases.

In order to increase the electron emission efficiency of the thin film cathode, it is effective to reduce the thickness of the top electrode 13 as much as possible to reduce energy loss due to the scatter of the hot electrons in the top electrode 13.

For example, Japanese Unexamined Patent Publication No. H2-121227 discloses a technique of forming a thin portion and a thick portion in an electron emitting portion by vacuum evaporation, sputtering, or selective etching using a photoresist.

In the top electrode 13 formed by a conventional thin film forming apparatus, however, when the thickness of the top electrode 13 is reduced too much, the electrode film grows in island shapes on an insulating film, sheet resistance of the electrode sharply increases, and a voltage drop occurs in the surface of the electron emitting portion. Consequently, a problem such that an effective driving voltage Vd cannot be applied to the thin film cathode occurs.

Methods for solving the problem include, for example, a method proposed in Japanese Unexamined Patent Publication No. H2-172127 in which an inclined portion is formed in a thick top electrode so as to expose the surface of a lower insulator and electrons are emitted from a thin portion at the lower inclined portion, and a method proposed in Japanese Unexamined Patent Publication No. H3-55738 in which an opening is formed in a thick top electrode so as to expose a lower insulator and electrons are emitted from the opening.

In the methods, however, it is difficult to assure a metal thin film portion as a key of electron emission with high reproducibility, so that improvement in the electron emission efficiency is limited.

Meanwhile, the inventors of the present invention have proposed a method disclosed in Japanese Patent Application No. 11-191423 in which a pixel is formed by a plurality of thin electron emitting portions to reduce the area of each electron emitting portion, and a thick bus electrode is formed around the electron emitting portion, thereby preventing a voltage drop. The method is preferable since the above-described resistance can be reduced and the metal thin film of the top electrode can be formed thinly independent of the bus electrode. However, when the size of each electron emitting portion and that of the bus electrode are reduced to increase the electron emission efficiency and improve the brightness of the display device, it is feared that required accuracy of alignment increases, and the ratio of the electron emitting portion, that is, the aperture ratio becomes lower. A drastic solving method of further improving the electron emission efficiency and brightness is therefore desired, which is realized by enlarging the area of the electron emitting portion in the thin film cathode as large as possible within the range of the pixel pitch of a display device, for example, to about 50 $\mu$m per side which is about the dot pitch of a high precision display device also in a flat panel of a large screen.

The inventors of the present invention also have proposed the technique in Japanese Unexamined Patent Publication No. H8-180794 aiming at high-efficient electron emission, in which fine dots having a height of 20 nm or lower are formed on a top electrode and the external electric field is concentrated onto the dots to thereby decrease the effective work function of the top electrode. It is, however, difficult to obtain a thin film cathode having high electron emission efficiency of 1 to 2% or higher with high reproducibility.

SUMMARY OF THE INVENTION

An object of the invention is to improve electron emission efficiency of a thin film cathode and to provide a display device with accordingly improved brightness.

More particularly, an object of the invention is to provide a display device with improved brightness, realized by enabling an effective driving voltage Vd to be applied to a thinned film cathode and irradiating phosphors with electrons emitted through a flat thin film electrode, and a process of fabricating the display device.

Aspects of the present invention disclosed in the specification will be briefly described as follows.

The invention has been achieved by paying attention that the mean free path of hot electrons largely depend on materials used for a thin film electrode in a display device using a thin film cathode for emitting electrons through the thin film electrode into pressure-reduced atmosphere.

Specifically, the electron emission efficiencies of various materials used for a top electrode were analyzed, and it was found for the first time from the analysis that due to a very short mean free path, which is about 0.5 to 5 nm, of a hot electron in the top electrode until the hot electron is scattered, the electron emission efficiency deteriorates. The invention has been made on the basis of an idea that the top electrode has to be made thinner than a conventional one. The object is achieved by positively providing the top electrode with a flat thin film part which is thinner than 5 nm, and irradiating the surface of a phosphor disposed so as to face the top electrode with electrons emitted through the flat thin film part to a vacuum.

A display device according to the invention is constructed in such a manner that a top electrode having a common flat thin film part and a plurality of island parts is disposed apart from a base electrode, a bus electrode for power supply connected to the flat thin film part is provided, phosphors are disposed over the top electrode and the bus electrode and, by applying a voltage between the base electrode and the bus electrode, the phosphors are irradiated with the electrons emitted through the flat thin film part into a vacuum.

With such a configuration, the flat thin film part through which hot electrons are emitted can be positively made thin independently of the bus electrode for power supply. The electron emission efficiency is improved, thereby enabling the display device with improved brightness to be realized.

An area occupied by the surface of the flat thin film part in the top electrode, that is, an effective electron emission area is set to be larger than an area occupied by the island parts at a surface level of the flat thin film part, thereby achieving an electron emission efficiency equivalent to that in the case where the thin film part is provided almost on the entire face of the top electrode.

The bus electrode has a two-layer structure of a thin lower layer connected to the flat thin film part serving as the electron emitting part and a thickly-formed upper layer serving as a low-resistant power supply part, thereby preventing discontinuation of the thin film electrode of the invention at an electric connection part and preventing a voltage drop due to sheet resistance in a large display device.

The island part itself formed in the top electrode on the electron emitting part defined by a protective layer and the like is not structurally in contact with the bus electrode for supplying a potential to the top electrode, and is physically apart from or independent of the bus electrode.

The thickness of each of the plurality of island parts projected from the surface of the common flat thin film part for emitting electrons (that is, the height from the surface level of the flat thin film part) is preferably larger than the thickness of the flat thin film part and also smaller than the thickness of the bus electrode for power supply. The invention is not limited to the arrangement.

According to the invention, the top electrode in the thin film cathode is formed by stacking, for example, a thin film of iridium (Ir) having a thickness of about 1 nm, a thin film of platinum (Pt) having a thickness of about 1 nm, and a thin film of gold (Au) having a thickness of about 2 to 3 nm in this order on an insulating layer, a semiconductor layer, a porous semiconductor layer, or a mixed film or stacked film of the layers provided on the base electrode, and performing a heat treatment. By the heat treatment, cohesion of the Au thin film is progressed around a small part of the Ir thin film as a nucleus and a plurality of island parts made of Au and Ir are formed. Among the island parts, a flat common thin film part from which the Au component is reduced by an amount of the cohesion and which becomes thinner than 5 nm is obtained with good reproducibility in a state where the plurality of island parts and the flat thin film part integrally exist. That is, by the heat treatment, the thin film is reconstructed and further reduction in the film thickness can be realized.

In order to effectively reduce the thickness of the flat thin film part by the formation of the island parts in the heat treatment, it is preferable to preliminarily thinly form each of the Ir film and the Pt film with a thickness of about 1 nm and the Au film with a thickness of about 1 to 3 nm.

From the analysis of the result of the heat treatment, Ir functions as a growth nucleus for cohering Au and forming an alloy, and Pt disturbs the contact between Ir and Au, thereby suppressing formation of an alloy. It is estimated that Pt has an action of suppressing or controlling the cohesion of Au.

The heat treatment is not therefore limited to the combination of Ir—Pt—Au. For example, a combination of Ir and Au without using Pt by controlling time and temperature of the heat treatment may be also used. Alternately, at least two kinds of other conductive materials having the above-described functions may be also employed.

According to the invention, a display device using a thin film cathode in which a top electrode is provided over a base electrode, a phosphor is disposed above the top electrode so as to face the top electrode, and pressure-reduced atmosphere is air-tightly kept in a space between the top electrode and the phosphor, is fabricated as follows. The top electrode is formed by providing a thin metal film on the base electrode, and then performing a heat treatment on the thin metal film such that a metal in the thin metal film coheres partially to thereby form island parts in the thin metal film, and make a part thereof remaining as a flat part thinner than initial thickness of the thin metal film. In such a manner, the display device can be easily fabricated with a high yield.

BRIEF DESCRIPTION OF THE DRAWINGS

Embodiments of the present invention are described below in conjunction with the figures, in which.

DETAILED DESCRIPTION OF THE PREFERRED EMBODIMENT

Preferred embodiments of the present invention will hereinafter be described in detail with reference to the accompanying drawings.

First Embodiment

A first embodiment of the invention will be described with reference to FIG. 1 and FIGS. 3 to 14.

Figure 3:
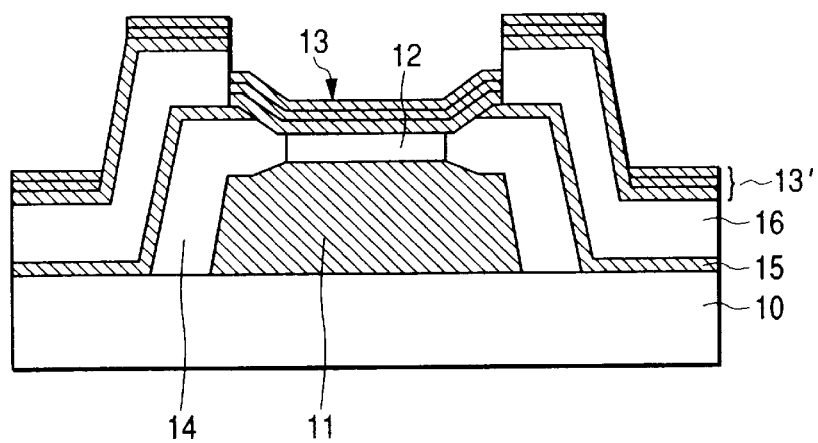
FIG. 3 is a cross section of a main portion showing a typical structure of a thin film cathode of the invention.

First, a thin film cathode of a metal-insulator-metal (MIM) type shown in FIG. 3 is formed as an example of the thin film cathode.

A metal film 11 for a base electrode is formed on an insulating substrate 10. The base electrode 11 is made of, for example, Al or an Al alloy. In this case, an Al-Nd alloy is used. As the method of forming the film, for instance, sputtering is used. After forming the film, the base electrode 11 is formed by etching.

A portion which becomes an electron emitting portion on the base electrode 11 is masked with a photoresist (not shown). The portion other than the electron emitting portion in the base electrode 11 is subjected to anodic oxidation in an electrolyte so as to be selectively made thick, thereby forming a protective insulator 14 made of $Al_2O_3$. When the anodizing voltage is set to 80V, the protective insulator 14 having a thickness about 109 nm is formed. The protective insulator 14 plays the role of limiting and defining the electron emitting portion and preventing the electric field from concentrating on the edge of the base electrode 11.

After completion of the formation of the protective insulator 14 by the anodic oxidation, the resist film is removed to partially expose the surface of the base electrode, and the electron emitting portion is subjected to anodic oxidation by using the base electrode 11 as an anode again. When the anodizing voltage is set to 6V, the insulator 12 made of $Al_2O_3$ having a thickness of about 10 nm is formed.

Subsequently, a film for a bus electrode interconnection is formed by two layers of a tungsten (W) film and an Al—Nd alloy film. The W film has a thickness of 10 nm and the Al—Nd film has a thickness of 200 nm. Specifically, the Al—Nd film formed on the entire surface and then the W film are selectively processed by etching of two stages, thereby forming the bus electrode interconnection of a two-stage structure of a lower bus electrode 15 of the W film in direct contact with the top electrode 13 which extends to the electron emitting portion side and will be described hereinafter and an upper bus electrode 16 of the Al—Nd film as a thickly-formed low-resistant power supply portion. With the structure, even when the top electrode 13 is formed very thin, the top electrode 13 can be prevented from being discontinued at the edge of the bus electrode interconnection.

Subsequently, the film for the top electrode 13 is formed by sputtering. In this case, a multi-layered film in which Ir, Pt, and Au are sequentially deposited is formed, and the films have a thickness of about 1 nm, 1 nm, and 2 to 3 nm, respectively, and a total thickness of 4 to 5 nm. The film thickness is selected in the range where the low-resistant top electrode 13 in which a voltage drop is sufficiently small in the electron emitting portion can be stably formed by sputtering. The area of the electron emitting portion is set to 50 μm per side. In FIG. 3, the three-layer metal film (13') constructing the top electrode is also deposited on the upper surface of the Al—Nd layer 16 so as to contribute to reduction in resistance of the bus electrode interconnection.

Subsequently, the substrate having the structure of the thin film cathode obtained as described above is disposed in an electric furnace and is heated. The temperature is increased by about 10° C. per minute. The maximum temperature is held for 10 to 25 minutes, and the temperature is decreased also by about 10° C. per minute. The maximum temperature is set to 410° C. in this case. The heating is carried out in atmosphere.

The top electrode 13 made of Ir, Pt, and Au is reconstructed by the heat treatment. As shown in the enlarged main portion of FIG. 1, a top electrode 23 having the structure in which a plurality of thick (or tall) island parts 17 and a flat thin film part 18 which is thinner than the original thickness by 4 to 5 nm are integrally connected to each other and mixedly exist can be formed. In other words, the plurality of island parts 17 are formed so as to be projected from the surface level of the common flat thin film part 18.

Figure 1:
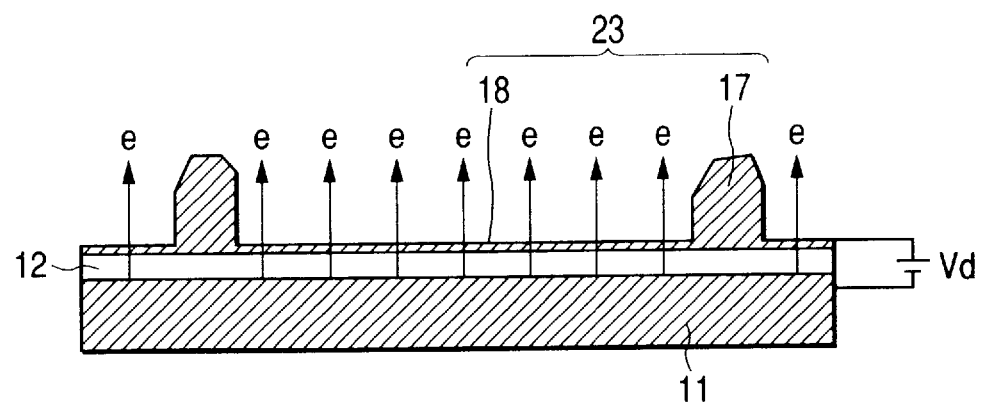
FIG. 1 is a cross section of a main portion showing the structure of a top electrode in a thin film cathode of the invention.
Figure 2:
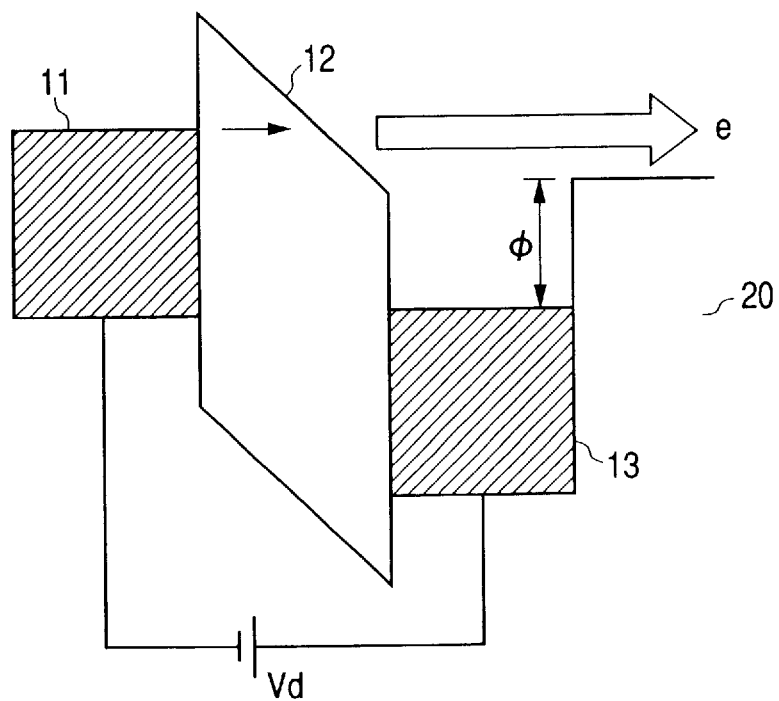
FIG. 2 is a diagram showing the operating principles of the thin film cathode.

When the voltage Vd of 10V is applied between the top electrode 23 and the base electrode 11 via the upper and lower bus electrodes 15 and 16, as shown in FIG. 1, hot electrons (e) are emitted not from the thick island parts 17 but from the flat thin film part 18 which is thinner than 5 nm to an above vacuum.

Figure 4:
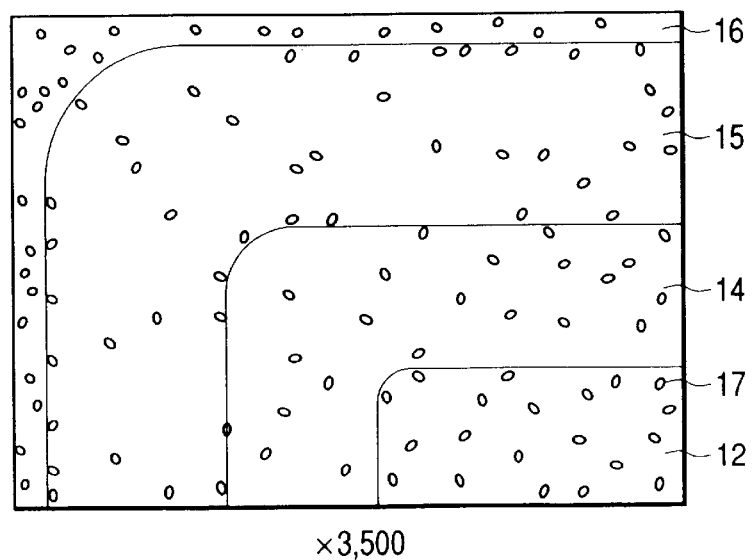
FIG. 4 is a sketch of a scanning electron microscope image of the top electrode portion in the thin film cathode of the invention.

FIG. 4 is a sketch for an image of a scanning electron microscope of a flat face near the electron emitting portion in the thin film cathode which has been subjected to the heat treatment. In all of the surface areas of the insulator 12, protective insulator 14, lower bus electrode 15, and upper bus electrode 16, a plurality of island parts 17 (small blank dots) each having a submicron diameter are observed.

Figure 5:
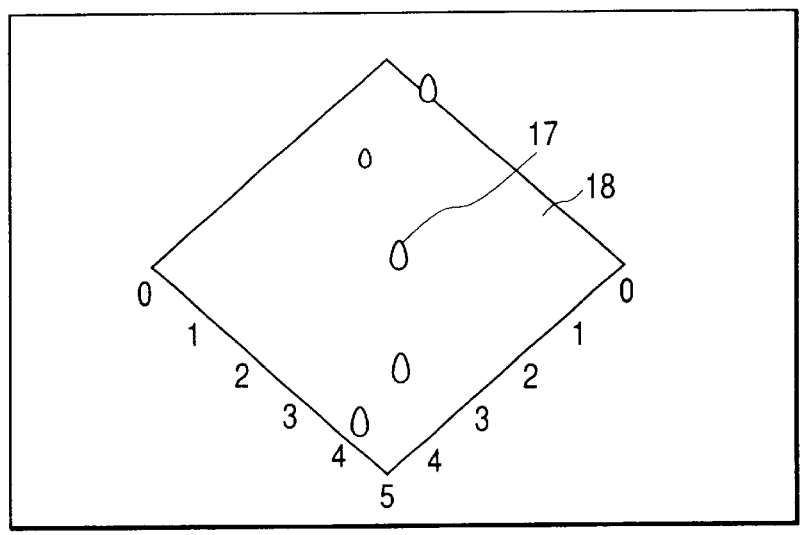
FIG. 5 is a sketch of an atomic force microscope image of the top electrode portion in the thin film cathode of the invention.

FIG. 5 is a sketch of an image acquired by an atomic force microscope (perspective view) of the structure of the top electrode 23. It is understood that the island parts 17 have a thickness (height) of about 150 nm from the surface level of the flat thin film part 18. The areas among the plurality of the island parts 17 are not particularly rough. The area of the surface of the flat thin film part 18 having a uniform thickness is much wider than the areas occupied by the island parts at the level of the surface of the flat thin film part.

Figure 6:
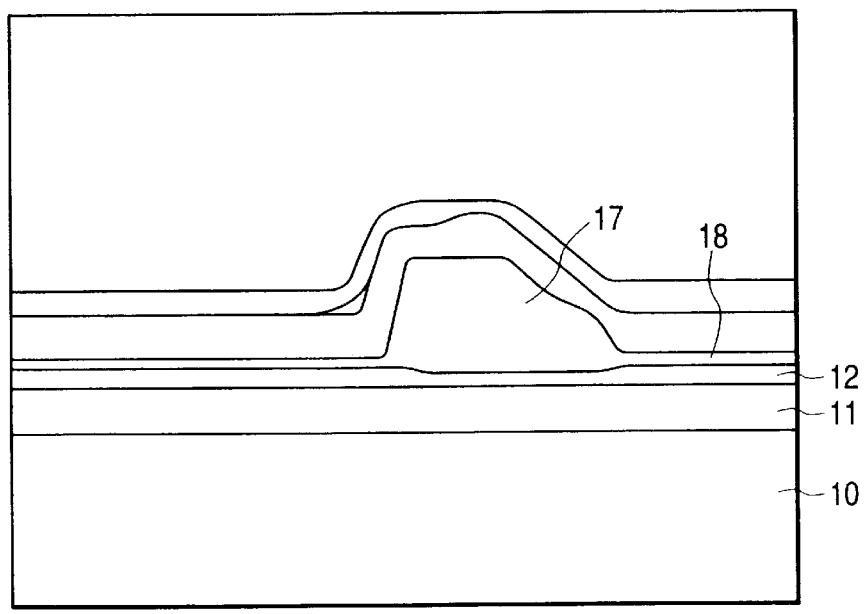
FIG. 6 is a sketch of a transmission electron microscope image of the top electrode portion in the thin film cathode of the invention.

FIG. 6 is a sketch for a cross sectional image of a transmission electron microscope of an area including the island part 17 in the electron emitting portion. It is seen that the island part 17 and the thin film part 18 mixedly exist in the top electrode 23. A structure on the island part 17 and the thin film part 18 in the diagram is a binder formed for observation and has no relation with the thin film cathode formed in the invention. In the portion indicated as the base electrode 11, although an Al-Nd film is supposed to exist inherently, the Al-Nd film is dissolved and lost due to a reaction with a Ga ion beam used for forming a sample for observation.

Figure 7A:
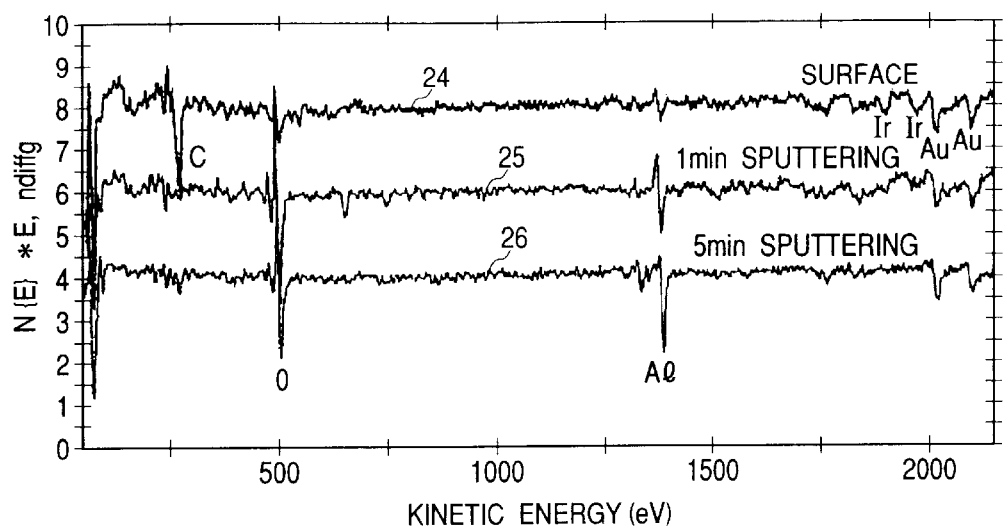
FIGS. 7A and 7B are diagrams showing Auger electron spectral characteristics of the top electrode portion in the thin film cathode of the invention.
Figure 7B:
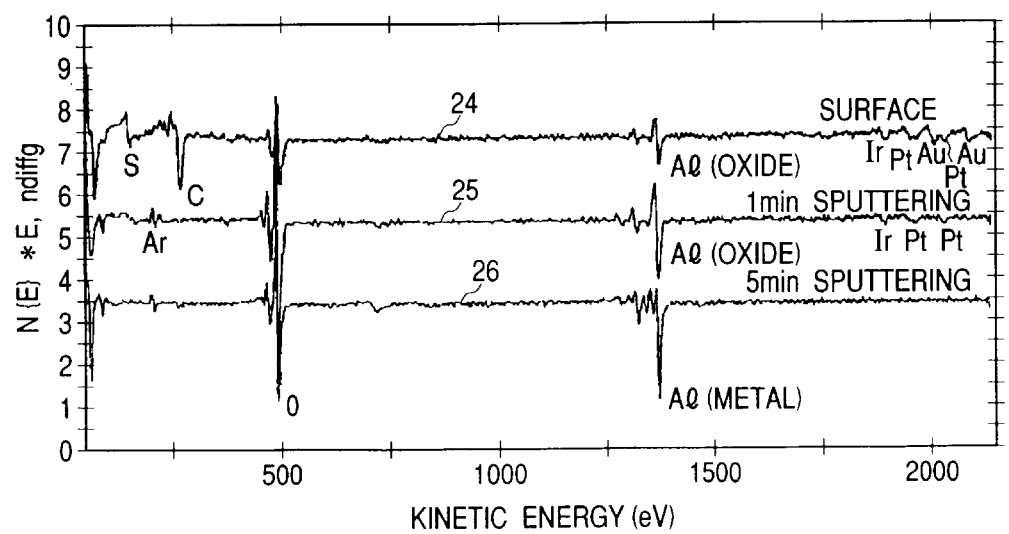

FIGS. 7A and 7B show results of analysis conducted on the surface of a very small area and analysis in the depth direction by Auger electron spectroscopy to analyze the composition of each of the island part 17 and the thin film part 18 in the top electrode 23. Characteristic waveforms 24, 25, and 26 in each of FIGS. 7A and 7B denote a characteristic in the surface exposed to the outside of the island portion 17 and the thin film portion 18, a characteristic of the inside obtained by performing sputtering for one minute, and a characteristic of the inside obtained by performing sputtering for five minutes, respectively.

As understood from FIG. 7A, strong peaks of Ir and Au are observed in the spectrum of the surface of the island parts 17. By the analysis in the depth direction by ion etching, peaks of only Au are observed. That is, it is understood that the island part 17 is obtained when Au coheres by using Ir as a growth nucleus.

As understood from FIG. 7B, spectra of all Ir, Pt, and Au are observed at almost same strength on the surface of the thin film part 18. When the analysis in the depth direction is conducted by ion etching, the peaks of Au disappear first, and peaks of Pt and Ir also disappear. Although the Ir—Pt—Au multi-layered or mixed structure is maintained in the thin film part 18, the strength of Au is as low as that of Ir and that of Pt. From this fact, it is understood that the composition ratio of Au in the thin film part 18 is reduced due to the cohesion of Au to the island part 17.

Figure 8:
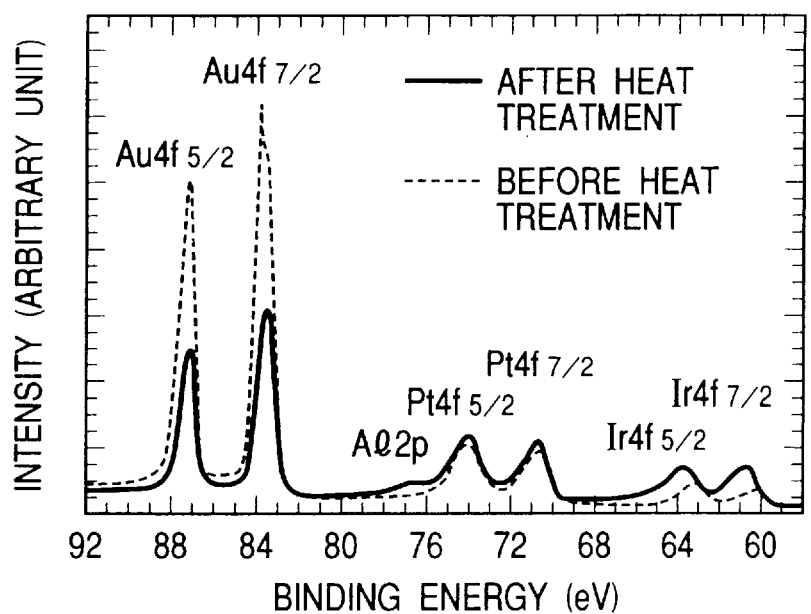
FIG. 8 is a diagram showing X-ray photoelectron spectral characteristics of the top electrode portion in the thin film cathode of the invention.

FIG. 8 is a characteristic diagram showing comparison between X-ray photoelectron spectra of the top electrodes 13 and 23 before and after the heat treatment. Since the diameter of an X-ray beam of an X-ray photoelectron spectroscope is as large as about 3 mm, the average compositions and structures of the top electrodes 13 and 23 each including the island part 17 and the thin film part 18 are reflected in the spectra.

The strength of Au after the heat treatment (solid line) is reduced to the half as compared with that before the heat treatment (broken line). On the contrary, the strength of Pt and Ir is about the same or increased for the following reason. Since the thickness of the Au film in the thin film part 18 occupying the most of the area of the top electrode 23 is reduced, the strength of Au decreases. The photoelectrons of Ir in the lower layer and Pt in the middle layer become more easily detected by an amount corresponding to the reduction in the thickness of the upper Au film.

Figure 9:
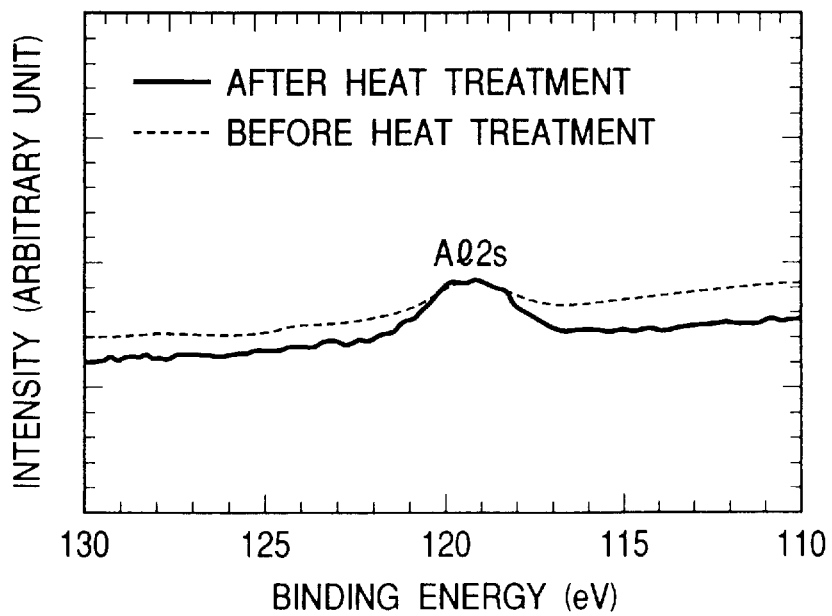
FIG. 9 is a diagram showing photoelectron spectral characteristics of the top electrode portion in the thin film cathode of the invention.

FIG. 9 shows the comparison of the photoelectron spectra influenced by Al in the insulator 12 positioning under the top electrodes 13 and 23 before and after the heat treatment. The strength of Al increases after the heat treatment. The reason is similar to the above. The thickness of the top electrode 23 is reduced in the thick film part 18, so that the photoelectrons become more easily detected.

From the above results, it is known that, in the top electrode 23 after the heat treatment, the island parts 17 are formed here and there by partially cohering the metal in the metal thin film, and the flat thin film part 18 obtained by reducing the thickness of the other flat portion so as to be thinner than the thickness of the initial thin film before the heat treatment extends.

As shown in the analysis results, since the reconstruction such as cohesion by the heat treatment on the top electrode 13 is used in the embodiment, the top electrode is made of at least two elements of a material of a growth nucleus and a material to cohere, and the composition of the island part 17 and that of the thin film part 18 are different from each other. This point is obviously different from that of the top electrode 13 formed by the conventional thin film forming method.

Although the three kinds of metals of Ir, Pt, and Au are used in the embodiment, the structure of the top electrode 23 may be also formed by using only two kinds of metals of Ir and Au. Since the Pt layer suppresses the contact between Ir and Au, it produces an effect of rather suppressing or controlling formation of the island part 17.

The shape and size of the island part can be varied by controlling the heat treatment temperature, heating time, thickness of the Pt layer, and the like. To appropriately reduce the thickness of the thin film part 18, as shown in FIGS. 4 and 5, the diameter of the island part (diameter in cross section) is preferably 1 $\mu$m or less and a thickness (that is, height) is preferably 100 nm or more. When the diameter of the island part (diameter in cross section) is too large, the thin film part 18 becomes too thin and poor conduction is apt to occur. When the thickness (that is the height from the surface of the flat thin part) is smaller than 100 nm, reduction in the film is insufficient. Desirably, the total cross sectional area of the plurality of island parts in the top electrode 23 at the flat thin film surface level is narrower than the area occupied by the flat thin film part around them.

The performances, particularly, the electron emission efficiency of the thin film cathode using the top electrode 23 constructed by the island parts 17 and the flat thin film 18 around the island parts 17 will now be described.

Figure 10A:
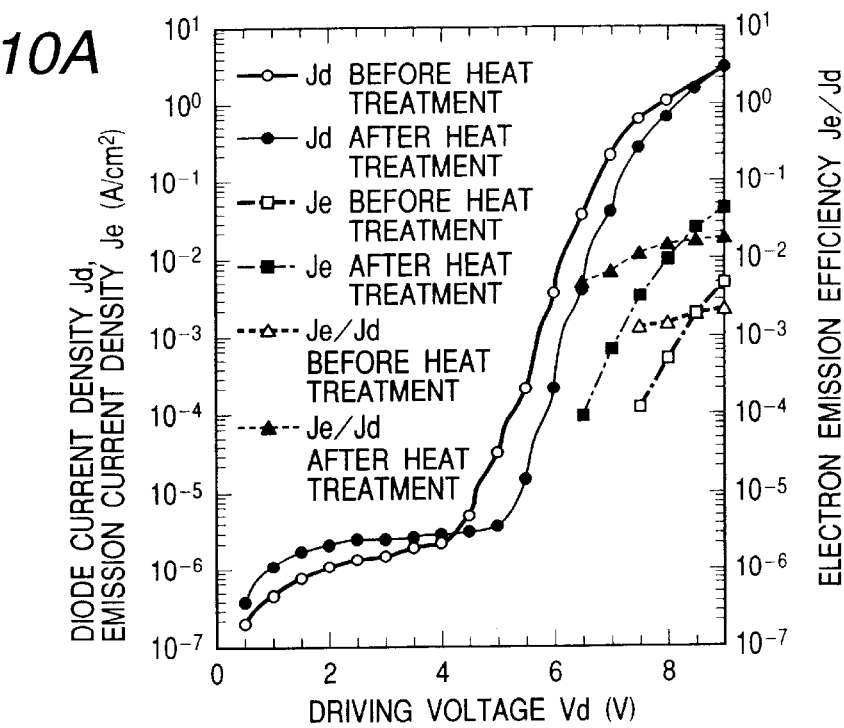
FIGS. 10A and 10B are characteristic diagrams for explaining effects of the invention.

FIG. 10A shows the result of comparison between density of a diode current flowing between electrodes in the thin film cathode, emission current density Je, and electron emission efficiency Je/Jd before the heat treatment and those after the heat treatment. The electron emission efficiency before the heat treatment is about 2×10(exp−3), that is, 0.2% with an application voltage of 9V, and that after the heat treatment is about 2×10(exp−2), that is, 2% and has improved by ten times.

As shown in FIG. 1, when the top electrode 23 of the invention is used, the top electrode in the thin film part 18 occupying the most of the electron emitting part is thin (thinner than 5 nm in practice), so that the scattering of the hot electrons is suppressed and the electrons are more easily emitted. As a result, the above improvement is made.

As shown in FIG. 10A, although the diode current density Jd shifts slightly with the tunnel current threshold voltage, it is almost the same in an operation voltage region (8 to 9V in FIG. 10A). That is, in the thin film cathode using the top electrode 23 of the invention, a voltage drop due to the electrode resistance is sufficiently small, and the driving voltage Vd sufficient to drive is applied to the thin film cathode. The reason of the above can be considered that, by the reconstruction of the thin film due to the heat treatment in the method of reducing the thickness of the film of the invention, the sheet resistance is low. The sheet resistance of the top electrode 23 in the embodiment is about 4 k$\Omega$/□ or lower. The voltage drop occurring in the electron emitting part having 50 $\mu$m per side can be estimated as 0.1V or less.

Figure 10B:
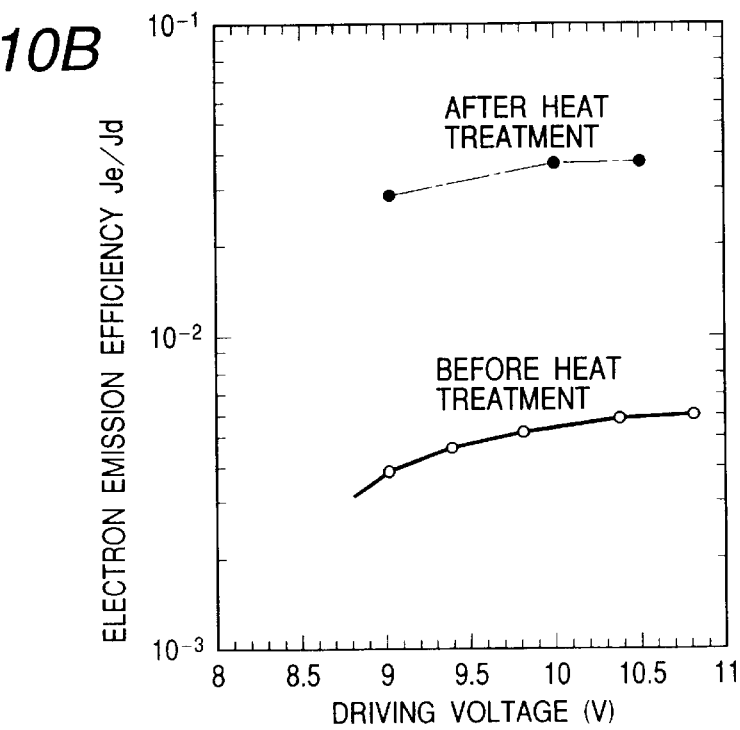

FIG. 10B shows the comparison between the electron emission efficiency of the thin film cathode in which the thickness of the insulator 12 made of $Al_2O_3$ is different from that of the first embodiment before the heat treatment and the electron emission efficiency after the heat treatment. In this example, the anodizing voltage of the anodic oxidation is set to 8V, and the thickness of the insulator 12 is set to about 13 nm. The other fabricating process and parameters are similar to those of the first embodiment.

As understood also from FIG. 10B, the electron emission efficiency before the heat treatment is about 5×10(exp−3), that is, 0.5% with the application voltage of 10V. The electron emission efficiency after the heat treatment improves to about 3.6×10(exp−2), that is, 3.6% which is about 7 times or more. The very high electron efficiency is obtained.

The process of fabricating the top electrode 23 by the heat treatment according to the invention can be performed in the heat treatment at the time of fabricating the display device, that is, the heat treatment in a frit glass sealing process for adhering a thin film cathode substrate and a phosphor substrate or the heat treatment in an exhausting process. The same temperature increasing speed, holding temperature, temperature decreasing speed, atmosphere, and the like in the heat treatment used in the embodiment as those in the heat treatment in the frit glass sealing process for adhering a cathode substrate and a phosphor substrate of a display device can be used. In such a manner, the display device having the top electrode 23 of the invention can be fabricated without increasing the number of fabricating steps, so that it is extremely advantageous. Obviously, the heat treatment of the invention may be performed separately from that in the display device fabricating process. Although the thin film cathode of the metal-insulator-metal (MIM) type has been described as an example in the embodiment, the invention can be naturally applied to a display device employing other thin film cathode using a top electrode provided via an electron accelerating layer or a hot electron accelerating layer such as an insulator or semiconductor layer on the base electrode. An example is a display device using a cathode of a MOS (metal-oxide-semiconductor) type, MIS (metal-insulator-semiconductor) type, HEED (high-efficiency-electro-emission device, described in Jpn. J. Appl. Phys., Vol. 36, p. L939 and the like), EL (electroluminescence, described in Applied Physics, Vol. 63, No. 6, p. 592, and the like), or a porous semiconductor type such as porous silicon (described in Applied Physics, Vol. 66, No. 5, p. 437, and the like).

The features of the present invention will be described hereinbelow by comparison with some conventional techniques so as to be easily understood.

Each of top electrodes disclosed in Japanese Unexamined Patent Publication Nos. 2-121227 and 2-172127 has a thin portion and a thick portion in its electron emitting portion. The top electrodes are obviously different from the various forms of the present invention with respect to various points such that electrons are not emitted through a flat thin film thinner than 5 nm, the top electrode is made of a single element, and a thick portion on the electron emitting portion is provided to supply a potential. In other words, in the various modes of the present invention, electrons are emitted through the flat thin film thinner than 5 nm, the top electrode is made of at least two kinds of elements since the reconstruction by heating the top electrode is used, and the thick island part is formed not for supplying a potential but formed rather separately from the bus electrode and is not structurally in direct contact with the bus electrode.

In Japanese Unexamined Patent Publication No. H3-55738, electrons are emitted from the opening in the top electrode. In contrast, in the present invention, electrons are emitted through the thin film part of the top electrode. The structures of the top electrodes are different from each other.

In Japanese Unexamined Patent Publication No. H8-180794, the top electrode has an island part and a thin film part. The conventional technique is obviously different from the various modes of the present invention with respect to the points such that electrons are not emitted through a flat thin film thinner than 5 nm, an electric field is concentrated on the island part having a height equal to or shorter than 20 nm and electrons are emitted from the island part, and each of the island part and the thin film part is made of a single element.

The fabricating process using the heat treatment of the invention is not disclosed in the above four conventional techniques.

Second Embodiment

A process of fabricating a display device according to a second embodiment of the invention in which the heating process of the invention is performed in a process of fabricating a panel of a display device will be described hereinbelow with reference to FIGS. 11A to 11C to FIG. 15.

Figure 11A:
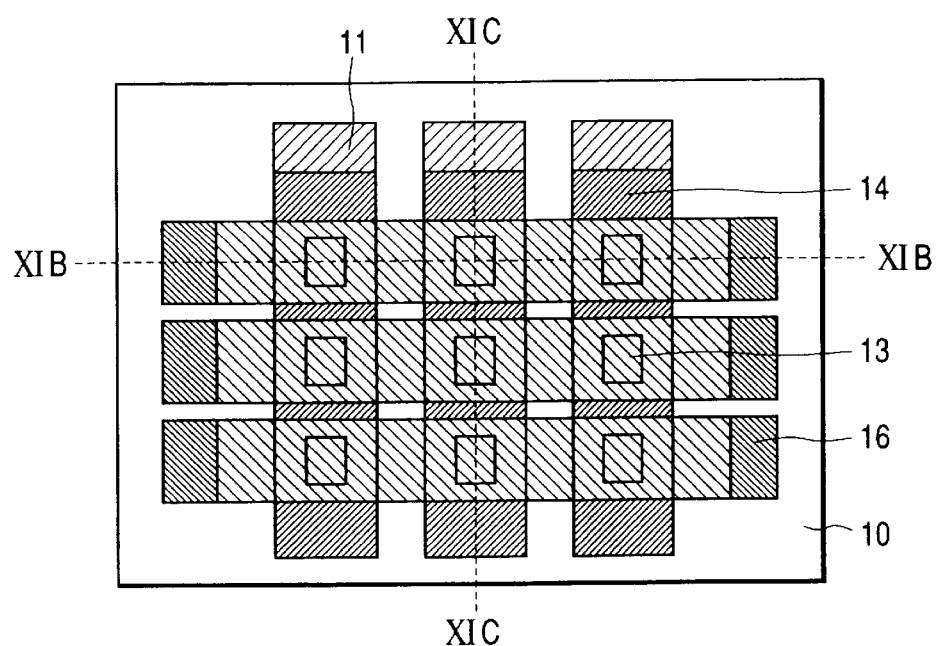
FIG. 11A is a plan view and FIGS. 11B and 11C are cross sections of a main portion of a display device of the invention.
Figure 11B:
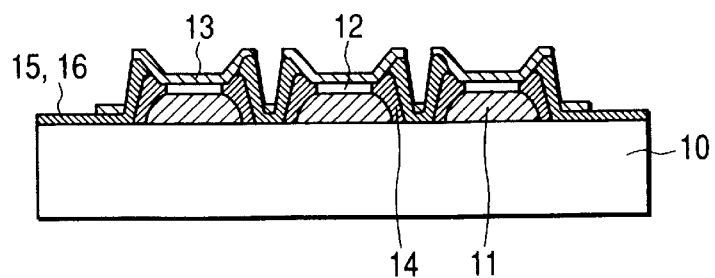
Figure 11C:
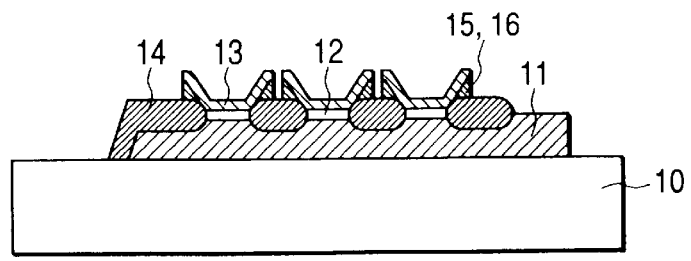

First, as shown in FIGS. 11A to 11C, a thin film cathode matrix in which three layers of Ir, Pt, and Au are stacked as the top electrode 13 on the insulating substrate 10 is formed. In practice, thin film cathode matrixes of the number corresponding to the number of display dots are formed. For simplicity of explanation, FIG. 11A is a plan view of a thin film cathode matrix of (3×3) dots constructed by the three base electrodes 11 and three bus electrodes 16 for supplying a potential to the top electrode. FIGS. 11B and 11C are cross sections taken along broken lines A–A' and B–B' of FIG. 11A, respectively. The above-described two-stage structured lower and upper bus electrodes 15 and 16 are shown as a single layer for simplicity of the drawings.

Figure 12A:
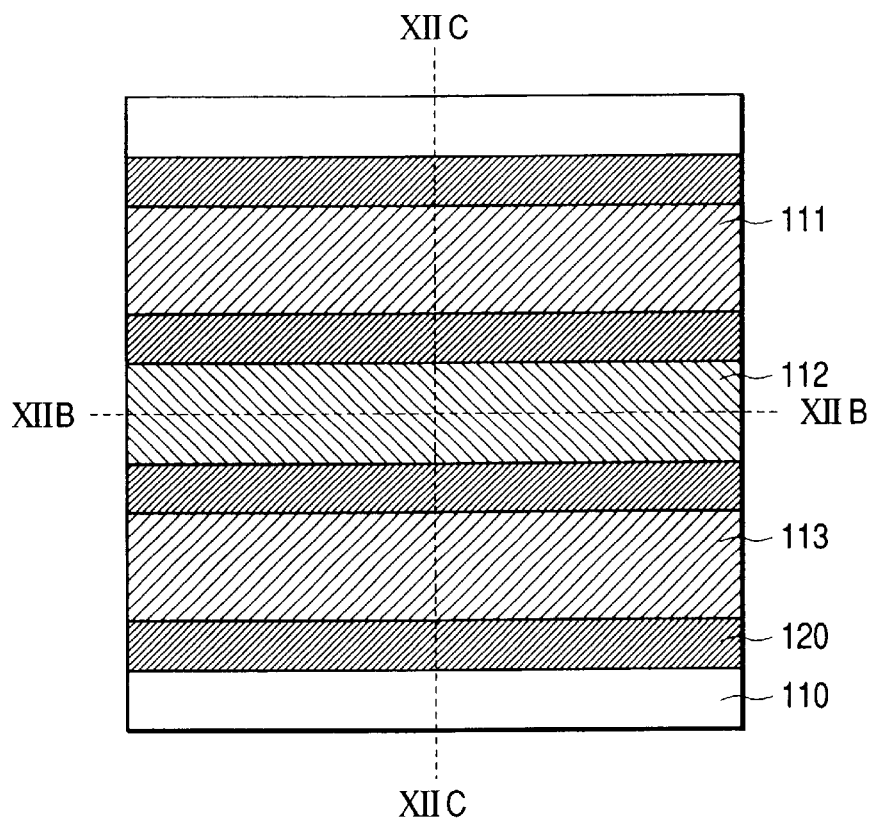
FIG. 12A is a plan view and FIGS. 12B and 12C are cross sections of another main portion of the display device of the invention.
Figure 12B:
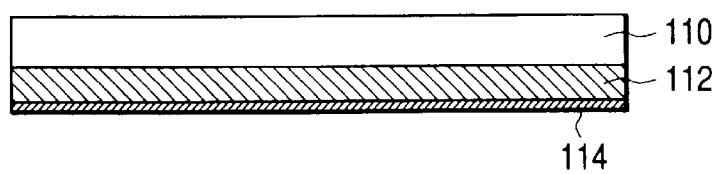
Figure 12C:
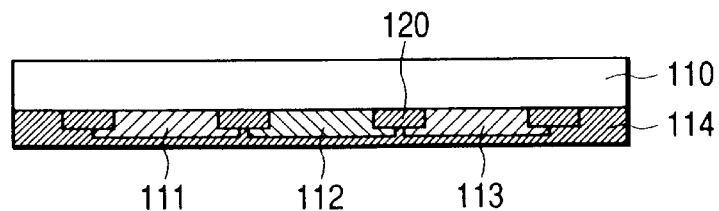

Meanwhile, a substrate of the display device side is fabricated as shown in FIGS. 12A to 12C. FIG. 12A is a plan view of the substrate and FIGS. 12B and 12C are cross sections taken along broken lines A–A' and B–B' of FIG. 12A, respectively.

As a face plate 110, a transparent glass plate or the like is used as shown in FIG. 12A. First, to increase the contrast of the display device, a black matrix 120 is formed. The black matrix 120 is formed by applying a solution in which PVA (polyvinyl alcohol) and ammonium bichromate are mixed with each other on the face plate 110, irradiating the part other than the part in which the black matrix 120 is to be formed with an ultraviolet ray so as to be photosensitized, removing the part which is not photosensitized, applying a solution in which graphite is dissolved to the removed part, and lifting off the PVA.

Subsequently, a red phosphor 111 is formed. A solution in which phosphor particles are mixed with PVA (polyvinyl alcohol) and ammonium bichromate is applied on the face plate 110, a part in which a phosphor is to be formed is irradiated with an ultraviolet ray so as to be photosensitized, and the part which is not photosensitized is removed with flowing water. In such a manner, the red phosphor 111 is patterned in stripes as shown in FIG. 12A. The stripe pattern is just an example. Obviously, according to the design of a display, other pattern, for example, an "RGBG" pattern in which a pixel is constructed by neighboring four dots can be also used. The thickness of each phosphor layer is set to be equal to about 1.4 to 2 layers. Similarly, a green phosphor 112 and a blue phosphor 113 are formed. As phosphors, for example, $Y_2O_2S$:Eu (P22-R) is used for red, ZnS:Cu, Al(P22-G) is used for green, and ZnS:Ag(P22-B) is used for blue.

After filming by using nitrocellulose or the like, as shown in FIG. 12B, Al is vapor-deposited on the entire face plate 110 to a thickness of about 75 nm, thereby forming a metal back 114. The metal back 114 functions as an accelerating electrode for electrons emitted from the thin film cathode. After that, the face plate 110 is heated at about 400° C. in atmosphere to decompose the film of nitrocellulose or the like and an organic matter such as PVA. In such a manner, the display side substrate is completed.

Figure 13A:
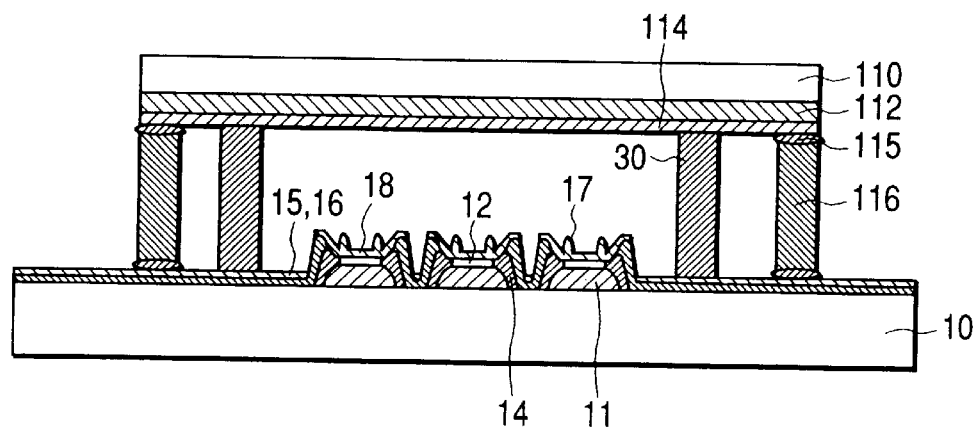
FIGS. 13A and 13B are cross sections of the display device of the invention.
Figure 13B:
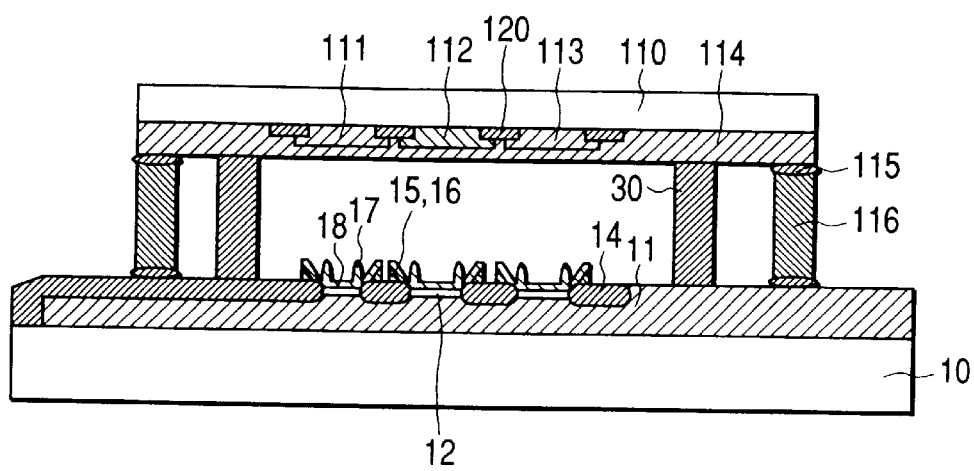

The display side face plate 110 fabricated as shown in FIGS. 12A to 12C and the substrate 10 fabricated as shown in FIGS. 11A to 11C are disposed to face each other and, as illustrated in FIGS. 13A and 13B, a peripheral frame 116 is sealed by using frit glass 115 via a spacer 30. Heat treatment for sealing is performed in such a manner that the temperature is increased by about 10° C. per minute, the maximum temperature is held for 10 to 25 minutes, and the temperature is decreased by about 10° C. per minute. The maximum temperature is 410° C. By the heat treatment, the display side face plate 110 and the substrate 10 are sealed and, simultaneously, the top electrode 13 in the thin film cathode is reconstructed as described above. The top electrode 23 of the invention having the structure in which the thick island parts 17 and the flat thin film part 18 are integrally connected and mixedly exist is formed.

FIGS. 13A and 13B are cross sections taken along broken line A–A' and broken line B–B' of FIG. 11A, respectively, each showing a main portion of the finished display panel.

Although columns of spacers are provided every dots emitting R (red), G (green), and B (blue) light, that is, every three lower electrodes 11, the number (density) of the columns can be reduced as long as the mechanical strength is sufficient. The spacers 30 are fabricated by opening holes each having a desired shape by, for example, sand blast, in an insulating plate made of glass, ceramics, or the like having a thickness of about 1 to 3 mm. Alternately, plate-shaped or pillar-shaped columns made of glass or ceramics may be arranged as spacers 30.

The sealed panel is exhausted to a pressure-reduced atmosphere of about 10 (exp−7) Torr or lower (hereinbelow, called vacuum) and is sealed. After that, a getter is activated and the degree of vacuum is maintained. For example, in the case of a getter having Ba as a main component, a getter film can be formed by high frequency induction heating. In such a manner, the display panel using the thin film cathode as shown in FIGS. 13A and 13B is completed.

Figure 14:
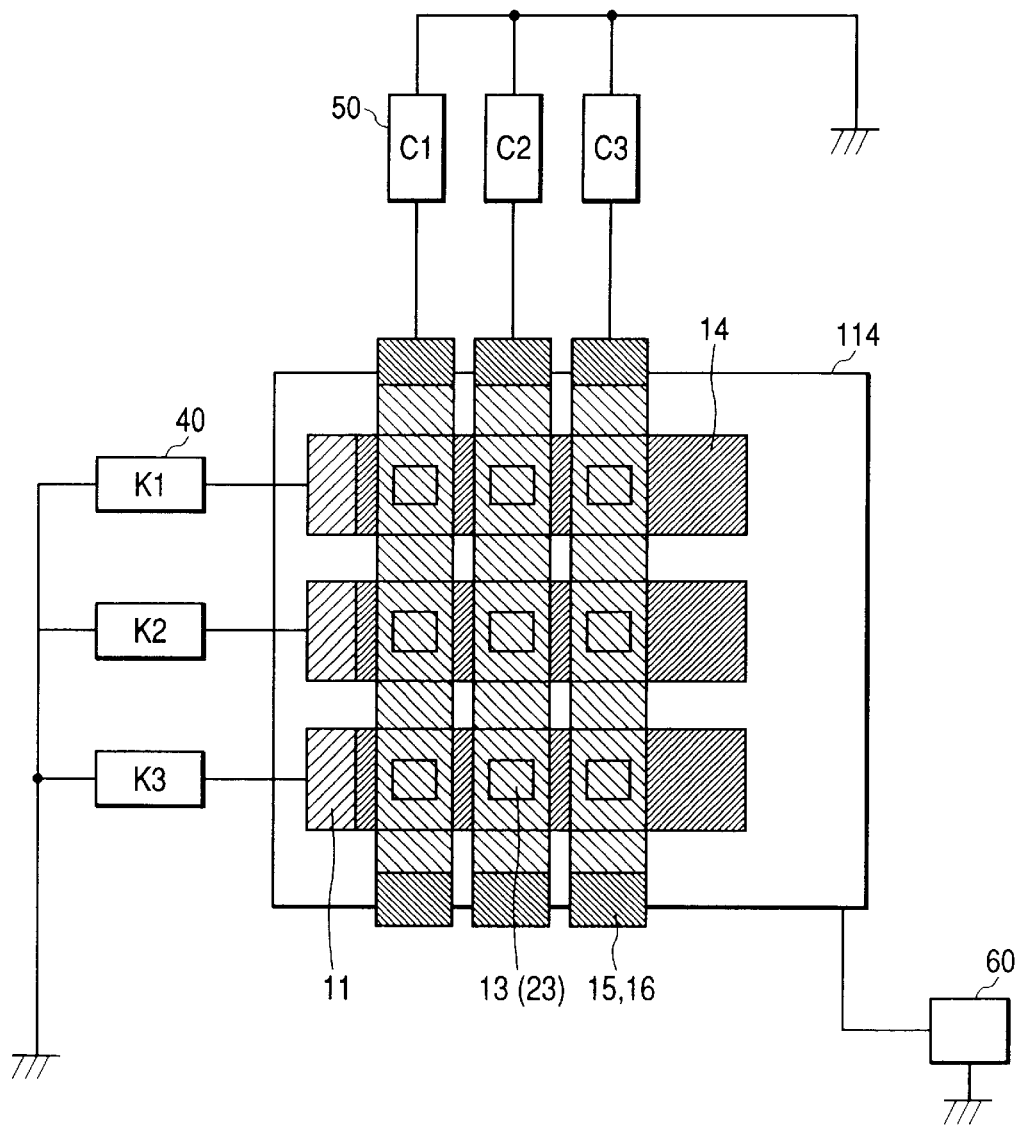
FIG. 14 is a plan view of a main portion of the display device of the invention, showing connections of the display device to driving circuits.

Since the distance between the face plate 110 and the substrate 10 is as long as about 1 to 3 mm, the accelerating voltage to be applied to the metal back 114 can be set to be as high as 3 to 6 KV. Therefore, as described above, a phosphor for a cathode ray tube (CRT) can be used as the phosphor. The display characteristics such as brightness can be further improved. FIG. 14 is a connection diagram showing connection of the display device panel fabricated as described above to driving circuits. The base electrode 11 is connected to a base electrode driving circuit 40. The bus electrodes 15 (16) are connected to a top electrode driving circuit 50. An intersection point between Km indicative of the m-th base electrode 11 and Cn indicative of the n-th bus electrode 15 (16) will be expressed as (m, n). An accelerating voltage 60 of about 3 to 6 KV is always applied to the metal back 114.

Figure 15:
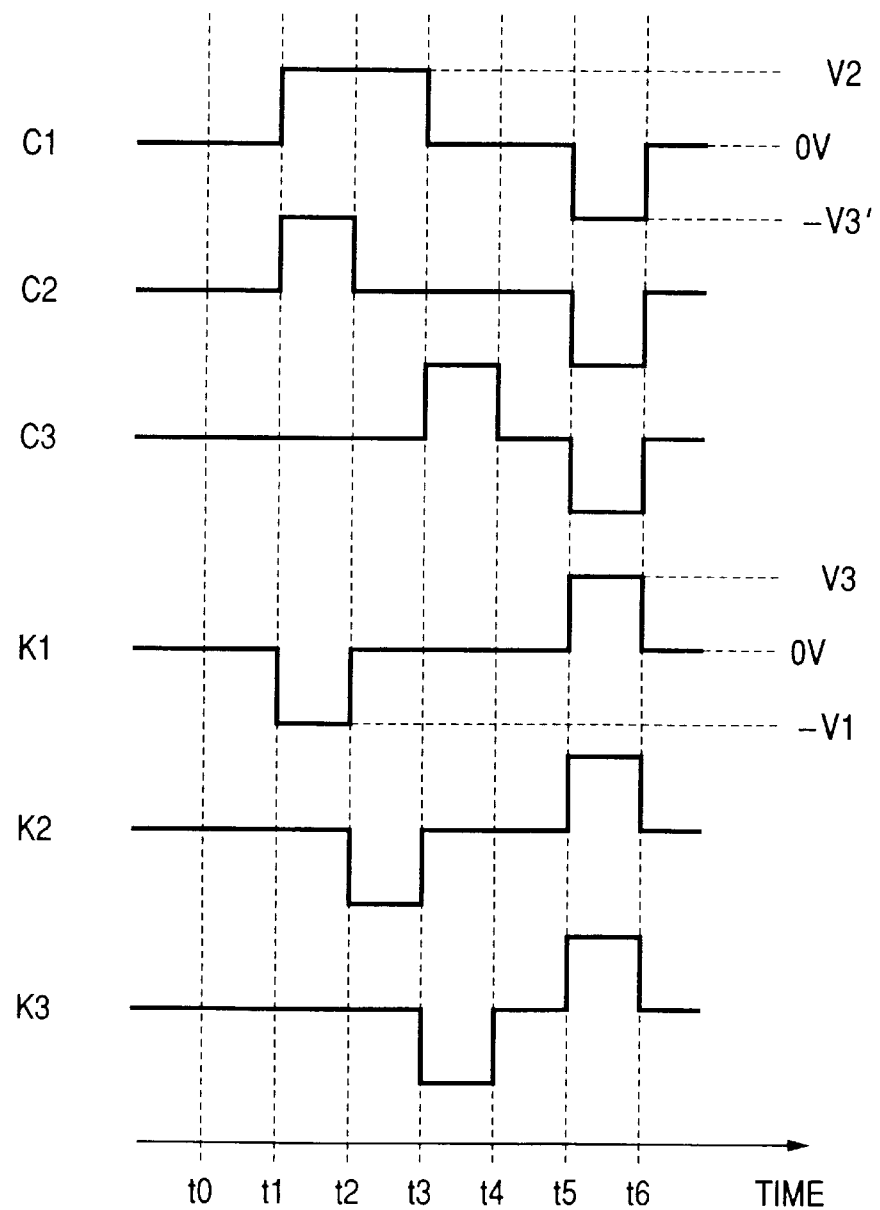
FIG. 15 is a diagram showing driving voltage waveforms in the display device of the invention.

FIG. 15 shows an example of waveforms of generation voltages of the driving circuits in FIG. 14. At time t0, no voltage is applied to any of the electrodes, so that no electrons are emitted. Therefore, the phosphor does not emit light.

At time t1, a voltage −V1 is applied to K1 of the base electrode 11 and a voltage +V2 is applied to C1 and C2 of the bus electrode 15 (16). Since a voltage (V1+V2) is applied across the base electrode 11 and the top electrode 13 at the intersection point (1, 1) and (1, 2), by setting (V1+V2) to be equal to or higher than the electron emission start voltage or higher, electrons are emitted to a vacuum from the thin film cathode at the two intersection points. The emitted electrons are accelerated by the accelerating voltage 60 applied to the metal back 114 and enter the phosphor to make the phosphor emit light.

At time t2, when a voltage −V1 is applied to K2 of the base electrode 11 and a voltage +V2 is applied to C1 of the bus electrode 15 (16), similarly, light emits at the intersection point (2, 1). In such a manner, by changing a signal applied to the bus electrode 15 (16), a desired image or information can be displayed.

By properly changing the magnitude of the voltage V1 applied to the bus electrode 15 (16), an image having gradation can be displayed. A reverse voltage for releasing charges stored in the insulator 12 is applied in such a manner that −V1 is applied to all of the base electrodes 11, after that, V3 is applied to all of the base electrodes 11, and −V3' is applied to all of the top electrodes 13. It is set so that (V3+V3') is almost equal to (V1+V2).

Figure 16A:
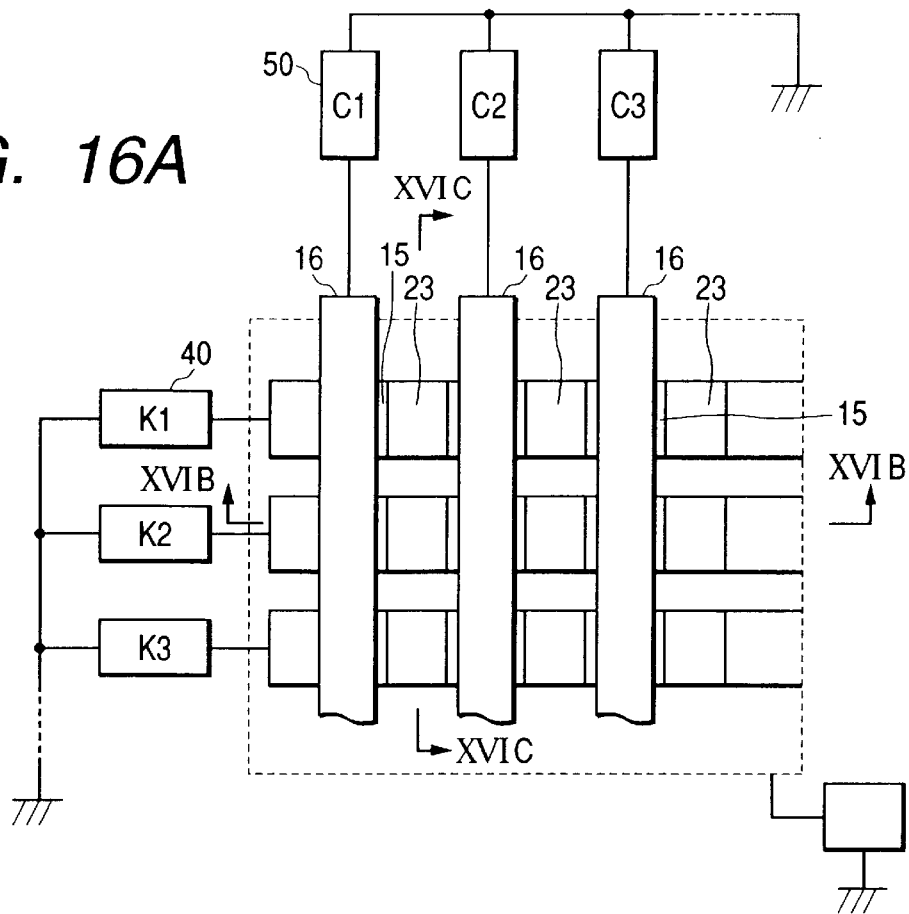
FIGS. 16A to 16C are plan view and cross sections of a main portion of another display device of the invention, showing connections of the display device to driving circuits.
Figure 16B:
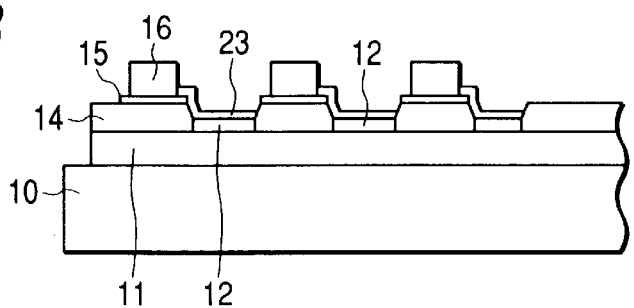
Figure 16C:
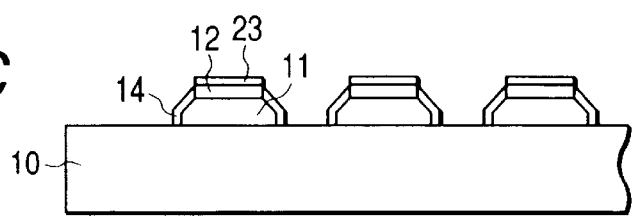

For easier understanding, in FIGS. 11A, 14, and so on, the examples of the display device in which the electron emitting portion, that is, the top electrode 23 is provided in the width portion of the bus electrodes 15 and 16 have been described. As described above, the thick bus electrode 16 can be provided quite separately from the flat thin film part 18 which is extremely thin (thinner than 5 nm) and constructs the electron emitting part. Consequently, for example, by using the configuration of a main portion of a display panel as shown in FIGS. 16A to 16C, a display device adapted to high-definition display can be obtained. The configuration of the display device and the process for fabricating the display device are proposed by the inventors of the present invention, in Japanese Unexamined Patent Publication No. H11-120898 and the like.

FIG. 16A is a plan view showing a main portion of the display panel and driving signal supplying circuits in a manner similar to FIG. 14. FIGS. 16B and 16C are cross sections taken along lines A–A' and B–B' of FIG. 16A, respectively, each showing a device main portion.

As understood from FIGS. 16A to 16C, the plurality of thick bus electrodes 16 are arranged in parallel with each other linearly on the substrate 10. The plurality of base electrodes 11 are arranged in parallel with each other so as to be orthogonal to the bus electrodes 16. Each electron emitting part constructed by the thin insulator 12 and the thin top electrode 23 is connected to the bus electrode 15 on one side in a portion which is on the base electrode 11 and in which the bus electrode 16 is not provided (that is, between the neighboring bus electrodes 16). That is, the top electrode 23 and the bus electrode 16 are electrically connected to each other via the thin lower bus electrode 15.

In such a manner, a number of electron emitting parts 23 each constructed by the very thin flat film 18 and the island parts 17 described in the first embodiment, constructing display dots can be easily arranged in a matrix at high density. Consequently, a large flat screen measuring, for example, 30 inches or more from the upper left corner to the lower right corner can be formed with high definition.

Further, the black matrix (120 in FIGS. 12A to 12C but not shown in FIGS. 16A to 16C) is disposed on the substrate where no base electrodes 11 extending in parallel exist and on the bus electrodes 16 extending in parallel, that is, on the opposite display-side substrate so as to cover the parts other than the electron emitting parts, thereby enabling screen flickering and the like to be effectively prevented.

Although the display device using the thin film cathode of the metal-insulator-metal (MIM) type has been described as an example in the foregoing embodiments, the invention can be also applied to a display device using other thin film cathode. For example, the invention can be also applied to display devices using various thin film cathodes of MOS (metal-oxide-semiconductor) type, MIS (metal-insulator-semiconductor) type, HEED (high-efficiency-electro-emission device) type, EL (electroluminescence) type, porous silicon (porous semiconductor layer) type, and the like.

In the display device using the thin film cathode of the invention, electrons emitted with high emission efficiency through the very thin film electrode to a vacuum can enter the phosphors. Thus, a high-brightness, low-power consumption, and large-panel display device can be realized.

What is claimed is:

1. A display device using a thin film cathode, comprising:
a top electrode disposed over a base electrode, said top electrode having a flat thin film part for emitting electrons and a plurality of island parts;
a bus electrode connected to said flat thin film part in said top electrode; and
a phosphor disposed over said top electrode and said bus electrode so as to face each other,
wherein said island parts in said top electrode are thicker than said flat thin film part, and by applying a voltage between said base electrode and said bus electrode, said phosphor is irradiated with the electrons emitted from said flat thin film part.

2. A display device using a thin film cathode according to claim 1, wherein a thickness of said bus electrode is different from that of said flat thin film part and that of said island parts in said top electrode.

3. A display device using a thin film cathode according to claim 1, wherein an area occupied by the surface of said flat thin film part in said top electrode is larger than an area occupied by said island parts at a surface level of said flat thin film part.

4. A display device using a thin film cathode according to claim 1, wherein said bus electrode is constructed by a lower bus electrode connected to said flat thin film part in said top electrode and an upper bus electrode apart from said island parts in said top electrode and thicker than said lower bus electrode.

5. A display device using a thin film cathode according to claim 1, wherein said top electrode is made of a metal containing Ir and Au.

6. A display device using a thin film cathode according to claim 1, wherein said top electrode is made of a metal containing Ir, Pt, and Au.

7. A display device using a thin film cathode according to claim 1, wherein said flat thin film part in said top electrode is thinner than 5 nm.

8. A display device using a thin film cathode according to claim 1, wherein said island parts in said top electrode have a diameter which is 1 $\mu$m or less and a thickness which is 100 nm or more.

9. A display device using a thin film cathode comprising a base electrode; a top electrode; and an insulating layer, a semiconductor layer, a porous semiconductor layer, or a mixture film or stacked film of the layers sandwiched by the top and base electrodes; which by application of a voltage between the base electrode and the top electrode, emits electrons from the top electrode side into pressure-reduced atmosphere to irradiate a phosphor disposed on the opposite side with the emitted electrons,
wherein said top electrode has a structure in which a plurality of island parts made of at least two kinds of elements and a common flat thin film part having an area larger than the island parts and emitting said electrons mixedly exist, and
wherein said island parts in said top electrode are thicker than said flat thin film part.

10. A display device using a thin film cathode according to claim 9, wherein a composition ratio of elements of said island parts in said top electrode and that of elements of said flat thin film part in said top electrode are different from each other, and said elements of said island parts are identical to those of said flat thin film part.

11. A display device using a thin film cathode according to claim 9, wherein said island parts in said top electrode have a diameter equal to or smaller than 1 $\mu$m and a thickness equal to or larger than 100 nm.

12. A display device using a thin film cathode according to claim 9, wherein said top electrode is made of a metal containing Ir and Au.

13. A display device using a thin film cathode according to claim 9, wherein said top electrode is made of a metal containing Ir, Pt, and Au.

14. A display device using a thin film cathode according to claim 9, further comprising a bus electrode for supplying a potential to said top electrode, the bus electrode having a two-layer structure of a lower interconnection connected to said flat thin film part serving as an electron emitting part and an upper interconnection thicker than the lower interconnection.

15. A display device using a thin film cathode according to claim 14, wherein said island parts in said top electrode are apart from said upper interconnection in said bus electrode.

16. A process of fabricating a display device using a thin film cathode in which a top electrode is provided over a base electrode, a phosphor is disposed above said top electrode so as to face said top electrode, and pressure-reduced atmosphere is air-tightly kept in a space between said top electrode and said phosphor,
wherein said top electrode is formed by providing a thin metal film on said base electrode, and then performing a heat treatment on said thin metal film such that a metal in the thin metal film coheres partially to thereby form island parts in the thin metal film, and make a part thereof remaining as a flat part thinner than initial thickness of the thin metal film.

17. A process of fabricating a display device using a thin film cathode according to claim 16, wherein said thin metal film is a stacked thin film of Ir and Au and is provided on said base electrode.

18. A process of fabricating a display device using a thin film cathode according to claim 16, wherein said thin metal film is a stacked thin film of Ir, Pt, and Au and is provided on said base electrode.

* * * * *